Patented Feb. 21, 1939

2,147,628

UNITED STATES PATENT OFFICE

2,147,628

MOISTUREPROOF MATERIAL

William Hale Charch, Buffalo, N. Y., assignor, by mesne assignments, to E. I. du Pont de Nemours & Company, Wilmington, Del., a corporation of Delaware No Drawing. Application December 22, 1928, Serial No. 328,047. Renewed May 2, 1935

56 Claims. (Cl. 91—68)

This invention relates to moistureproof material and the method of making the same. More particularly, it relates to moistureproof sheets or films of regenerated cellulose and to the method of making the same. By the term "moistureproof" used herein I mean the ability to resist the diffusion of water vapor to an extent at least as great as or exceeding that displayed by ordinary waxed papers employed as wrappers and functioning to resist the penetration of water vapor therethrough to a substantial degree for a substantial period of time, depending on the article being wrapped and/or being approximately seven times or more as effective as uncoated sheets or films of regenerated cellulose when tested in accordance with the test set forth in the Journal of Industrial & Engineering Chemistry, page 575, vol. 21, No. 6 (June, 1929).

One of the most important uses of sheets or films of regenerated cellulose is to wrap various articles to produce attractive and ornamental packages. In the case of a number of articles of trade, such as bread, cake, tobacco products, candy and other products containing moisture, it is desirable to maintain the articles in a relatively fresh and moist condition. Accordingly, it is necessary to treat the sheets or films of regenerated cellulose to prevent or resist the transmission or diffusion of water vapor or moisture whereby the article wrapped cannot lose its moisture. To attain this object, sheets or films of regenerated cellulose have been treated so as to be rendered moistureproof. The methods used prior to this invention for rendering sheets or films of regenerated cellulose moistureproof comprised applying a composition including a cellulose derivative, a gum, a wax, a plasticizer and a solvent or solvent mixture and subsequently eliminating the solvent or solvent mixture, whereby the moistureproof material was produced. This material was transparent, colorless, odorless, flexible, non-tacky and successfully resisted the transmission of moisture.

I have found that I can obtain a satisfactory material by first coating the base of regenerated cellulose with a moistureproofing composition comprising a gum, a wax and a plasticizer and subsequently coating said moistureproof coating with a shellac, varnish, lacquer, or cellulose dope containing cellulose acetate, cellulose nitrate, cellulose ether or other suitable cellulose derivatives.

It is, therefore, an object of this invention to provide a method of coating transparent sheets or films of regenerated cellulose to moistureproof the same.

Another object of this invention is to provide a method of coating transparent sheets or films of regenerated cellulose with a moistureproofing composition and then applying a surface coating to protect said moistureproofing composition without destroying any of the desirable characteristics of the desired product.

Another object of this invention is to provide moistureproof sheets or films of regenerated cellulose having a moistureproof coating comprising a gum, a wax and a plasticizer thereon which adheres to the base.

A further object of this invention is to moistureproof sheets or films of regenerated cellulose, said sheets or films having a moistureproof coating thereon and a surface coating superimposed on said moistureproof coating.

A specific object of this invention is to provide transparent sheets or films of regenerated cellulose having a moistureproof coating comprising a gum, a wax and a plasticizer and superimposed thereon a smooth, non-tacky, transparent coating.

Other objects will appear from the following description and appended claims.

The method which constitutes one part of this invention comprises applying a transparent moistureproof coating to a transparent sheet or film of regenerated cellulose. Various materials and compositions may be used for this coating. It is essential only that such materials and compositions be transparent. I have found that a composition comprising a gum, a wax and a plasticizer produces satisfactory results. I have also found that, when a composition of the type above described has been applied and dried, it has an undesirable tack and is apt to take finger marks when handled. Furthermore, these sheets or films of regenerated cellulose thus coated would adhere together when piled, stacked, rolled or stored in any other such manner. These characteristics somewhat restrict the field of use of the material. In order to enlarge the field of use, I provide said coated sheets or films of regenerated cellulose with a surface coating, that is, a coating which will eliminate the undesirable tack above described and which will not interfere with the desirable properties of the moistureproof sheets or films.

In carrying out the process, the transparent sheets or films of regenerated cellulose are coated with a composition comprising a gum, a wax, a plasticizer and a suitable solvent by passing said films or sheets through a bath containing these ingredients. It is to be understood that any other procedure for coating the sheet or film may be used.

As above stated, the ingredients of the composition comprise a gum, a wax, a plasticizer and a solvent. For the gums I have found that rosin, ester gum, gum mastic, gum dammar, natural or synthetic resins or other varnish gums may be used. The wax which I prefer to use is a high melting point paraffin wax, although other waxes, such as ceresin, beeswax or mixtures thereof may be used. For plasticizers numerous compounds may be used. I prefer, however, to use an odorless plasticizer such as tri-cresyl phosphate, triphenyl phosphate, blown soya bean oil. Any volatile solvent such as benzene, toluene, gasolene, and the like, may be used to reduce the composition to a satisfactory liquid condition.

The relative proportions of these ingredients may be varied between wide limits. Usually, as to the film-forming ingredients the gum predominates over the wax to the extent of two parts of gum for one part of wax, although satisfactory results may be obtained with as much as two parts of gum for two parts of wax. The plasticizer is present only in sufficient quantities to permit the desired flexibility of the coating and it usually comprises from 5% to 30% of the coating.

After the composition has been applied to the film or sheet, the coated film or sheet is dried in any suitable manner. The product produced at this stage of the process is a moistureproof sheet or film of regenerated cellulose. It is also flexible, odorless and transparent. However, the coating possesses an undesirable tack whereby its use may be restricted to some extent. To enlarge the field of use, the previously mentioned coated article is coated with a solution, which, upon drying, is smooth, transparent, odorless, flexible, and does not in any way affect the desired characteristics of the coated film. Various compositions may be used to attain this result. Dopes comprising nitro-cellulose, cellulose acetate or cellulose ether, shellac solutions, ordinary transparent varnishes or lacquers or the like, with or without plasticizers, may be used. The only requisite for such compositions is that upon drying it must be transparent and non-tacky. When a surfacing composition is used including a solvent which is also a solvent of the moistureproofing composition, zones including a mixture of these two compositions are formed. This increases the adherence of the surface coating to the moistureproof coating. I prefer, however, to use a composition comprising a nitro-cellulose spray lacquer consisting of low viscosity nitro-cellulose, a plasticizer and a solvent.

To more clearly describe the invention the following specific examples are given. It is to be understood that these specific examples are merely illustrative and not limitative of the invention.

*Example I*

A sheet or film of regenerated cellulose is first passed through a solution containing

| | Parts |
|---|---|
| Rosin | 10 |
| Paraffin | 5 |
| Tri-phenyl phosphate | 1 |
| Toluene | 100 |

The films, upon withdrawing from the solution, are allowed to drain in order to permit the coating to spread uniformly. Or, if desired, the coated films may be subjected to suitable surplus-removing devices or spreaders. The solvent is then evaporated and the films are finally sprayed with a pyroxylin lacquer.

*Example II*

Same as Example I except blown soya bean oil to the extent of three parts is substituted for triphenyl phosphate.

The product of this invention comprises a base of regenerated cellulose, a moistureproof coating on each side of said base, said coating composed of a gum, a wax and a plasticizer, and preferably also superimposed coatings on each side composed chiefly of pyroxylin or other cellulose esters, shellac, varnish gums and the like. In cases where the solvent of the final coating used is also a solvent for the moistureproof composition, there will be zones between the moistureproof and surface coating including a mixture of the two compositions. The product is transparent, flexible, non-tacky and attractive.

Since it is obvious that various changes may be made in the above-described method and article without departing from the nature of the invention, I do not intend to limit myself to the specific details above set forth except as defined in the appended claims.

I claim:

1. A material suitable for use as a wrapping tissue comprising a transparent base film or sheet of regenerated cellulose having a coating consisting of a wax, a gum and a softener, the ingredients constituting the coating being present in proportions producing a moistureproof, flexible and transparent product.

2. A material suitable for use as a wrapping tissue comprising a transparent base film or sheet of regenerated cellulose having a coating consisting of a wax, a hydrocarbon-soluble gum and a softener, the ingredients constituting the coating being present in proportions producing a moistureproof, flexible and transparent product.

3. A material suitable for use as a wrapping tissue comprising a transparent base film or sheet of regenerated cellulose having a coating consisting of a wax, a toluene-soluble gum and a softener, the ingredients constituting the coating being present in proportions producing a moistureproof, flexible and transparent product.

4. A material suitable for use as a wrapping tissue comprising a transparent base film or sheet of regenerated cellulose having a coating consisting of a wax, rosin and a softener, the ingredients constituting the coating being present in proportions producing a moistureproof, flexible and transparent product.

5. A material suitable for use as a wrapping tissue comprising a transparent base film or sheet of regenerated cellulose having a coating consisting of paraffin, a gum and a softener, the ingredients constituting the coating being present in proportions producing a moistureproof, flexible and transparent product.

6. A material suitable for use as a wrapping tissue comprising a transparent base film or sheet of regenerated cellulose having a coating consisting of paraffin, a hydrocarbon-soluble gum and a softener, the ingredients constituting the coating being present in proportions producing a moistureproof, flexible and transparent product.

7. A material suitable for use as a wrapping tissue comprising a transparent base film or sheet of regenerated cellulose having a coating consisting of paraffin, a toluene-soluble gum and a softener, the ingredients constituting the coating being present in proportions producing a moistureproof, flexible and transparent product.

8. A material suitable for use as a wrapping tissue comprising a transparent base film or sheet of regenerated cellulose having a coating consisting of paraffin, rosin and a softener, the ingredients constituting the coating being present in proportions producing a moistureproof, flexible and transparent product.

9. A material suitable for use as a wrapping tissue comprising a transparent base film or sheet of regenerated cellulose having a coating consisting of a high melting point paraffin, a gum and a softener, the ingredients constituting the coating being present in proportions producing a moistureproof, flexible and transparent product.

10. A material suitable for use as a wrapping tissue comprising a transparent base film or sheet of regenerated cellulose having a coating consisting of a high melting point paraffin, a hydrocarbon-soluble gum and a softener, the ingredients constituting the coating being present in proportions producing a moistureproof, flexible and transparent product.

11. A material suitable for use as a wrapping tissue comprising a transparent base film or sheet of regenerated cellulose having a coating consisting of a high melting point paraffin, a toluene-soluble gum and a softener, the ingredients constituting the coating being present in proportions producing a moistureproof, flexible and transparent product.

12. A material suitable for use as a wrapping tissue comprising a transparent base film or sheet of regenerated cellulose having a coating consisting of a wax, a gum, and a softener, the ingredients constituting the coating being present in proportions producing a moistureproof, flexible and transparent product, and the quantity of gum being at least equal to the quantity of wax.

13. A material suitable for use as a wrapping tissue comprising a transparent base film or sheet of regenerated cellulose having a transparent moistureproof coating consisting of approximately 1 to 2 parts of a wax, 2 parts of a gum and a sufficient quantity of a softener to impart the desired flexibility.

14. A material suitable for use as a wrapping tissue comprising a transparent base film or sheet of regenerated cellulose having a transparent moistureproof coating comprising 10 parts of rosin, 5 parts of paraffin and 1 part of triphenyl phosphate.

15. A material suitable for use as a wrapping tissue comprising a transparent base film or sheet of regenerated cellulose having an under coating consisting of a wax, a gum and a softener, the ingredients constituting the coating being present in proportions producing a moistureproof, flexible and transparent product, and a smooth, non-tacky and transparent surface coating on said under coating.

16. A material suitable for use as a wrapping tissue comprising a transparent base film or sheet of regenerated cellulose having an under coating consisting of a wax, a hydrocarbon-soluble gum and a softener, the ingredients constituting the coating being present in proportions producing a moistureproof, flexible and transparent product, and a smooth, non-tacky and transparent surface coating on said under coating.

17. A material suitable for use as a wrapping tissue comprising a transparent base film or sheet of regenerated cellulose having an under coating consisting of a wax, a toluene-soluble gum and a softener, the ingredients constituting the coating being present in proportions producing a moistureproof, flexible and transparent product, and a smooth, non-tacky and transparent surface coating on said under coating.

18. A material suitable for use as a wrapping tissue comprising a transparent base film or sheet of regenerated cellulose having an under coating consisting of a wax, rosin and a softener, the ingredients constituting the coating being present in proportions producing a moistureproof, flexible and transparent product, and a smooth, non-tacky and transparent surface coating on said under coating.

19. A material suitable for use as a wrapping tissue comprising a transparent base film or sheet of regenerated cellulose having an under coating consisting of paraffin, a gum and a softener, the ingredients constituting the coating being present in proportions producing a moistureproof, flexible and transparent product, and a smooth, non-tacky and transparent surface coating on said under coating.

20. A material suitable for use as a wrapping tissue comprising a transparent base film or sheet of regenerated cellulose having an under coating consisting of paraffin, a hydrocarbon-soluble gum and a softener, the ingredients constituting the coating being present in proportions producing a moistureproof, flexible and transparent product, and a smooth, non-tacky and transparent surface coating on said under coating.

21. A material suitable for use as a wrapping tissue comprising a transparent base film or sheet of regenerated cellulose having an under coating consisting of paraffin, a toluene-soluble gum and a softener, the ingredients constituting the coating being present in proportions producing a moistureproof, flexible and transparent product, and a smooth, non-tacky and transparent surface coating on said under coating.

22. A material suitable for use as a wrapping tissue comprising a transparent base film or sheet of regenerated cellulose having an under coating consisting of paraffin, rosin and a softener, the ingredients constituting the coating being present in proportions producing a moistureproof, flexible and transparent product, and a smooth, non-tacky and transparent surface coating on said under coating.

23. A material suitable for use as a wrapping tissue comprising a transparent base film or sheet of regenerated cellulose having an under coating consisting of a high melting point paraffin, a gum and a softener, the ingredients constituting the coating being present in proportions producing a moistureproof, flexible and transparent product, and a smooth, non-tacky and transparent surface coating on said under coating.

24. A material suitable for use as a wrapping tissue comprising a transparent base film or sheet of regenerated cellulose having an under coating consisting of a high melting point paraffin, a hydrocarbon-soluble gum and a softener, the ingredients constituting the coating being present in proportions producing a moistureproof, flexible and transparent product, and a smooth, non-tacky and transparent surface coating on said under coating.

25. A material suitable for use as a wrapping tissue comprising a transparent base film or sheet of regenerated cellulose having an under coating consisting of a high melting point paraffin, a toluene-soluble gum and a softener, the ingredients constituting the coating being present in proportions producing a moistureproof, flexible and transparent product, and a smooth, non-tacky and transparent surface coating on said under coating.

26. A material suitable for use as a wrapping tissue comprising a transparent base film or sheet of regenerated cellulose having an under coating consisting of a wax, a gum and a softener, the ingredients constituting the coating being present in proportions producing a moistureproof, flexible and transparent product, the quantity of gum being at least equal to the quantity of wax, and a smooth, non-tacky and transparent surface coating on said under coating.

27. A material suitable for use as a wrapping tissue comprising a transparent base film or sheet of regenerated cellulose having a transparent moistureproof under coating consisting of approximately 1 to 2 parts of a wax, 2 parts of a gum, a sufficient quantity of a softener to impart the desired flexibility and a smooth, non-tacky and transparent surface coating on said under coating.

28. A material suitable for use as a wrapping tissue comprising a transparent base film or sheet of regenerated cellulose having a transparent moistureproof under coating comprising 10 parts of rosin, 5 parts of paraffin, 1 part of triphenyl phosphate and a smooth, non-tacky and transparent surface coating on said under coating.

29. A flexible material suitable for use as a wrapping tissue comprising a transparent base film or sheet formed of a non-fibrous material coated with a moisture-resisting composition in which the film-forming constituents consist essentially of a wax and a gum, the ingredients constituting the coating being present in proportions producing a moistureproof, flexible and transparent product.

30. A flexible material suitable for use as a wrapping tissue comprising a transparent base film or sheet formed of a non-fibrous cellulosic material coated with a moisture-resisting composition in which the film forming constituents consist essentially of a wax and a gum, the ingredients constituting the coating being present in proportions producing a moistureproof, flexible and transparent product.

31. In combination a base having a surface, a coating formed on a surface of the base comprising a major proportion of rosin and a minor proportion of paraffin and a coating comprising dominatingly nitrocellulose superimposed on said first mentioned coating.

32. A flexible material suitable for use as a wrapping tissue comprising a transparent base film or sheet formed of a non-fibrous cellulosic material coated with a moisture-resisting composition in which the film-forming constituents consist essentially of a wax and ester gum, the ingredients constituting the coating being present in proportions producing a moistureproof, flexible and transparent product.

33. A flexible material suitable for use as a wrapping tissue comprising a transparent base film or sheet of regenerated cellulose coated with a moisture-resisting composition in which the film-forming constituents consist essentially of a wax and ester gum, the ingredients constituting the coating being present in proportions producing a moistureproof, flexible and transparent product.

34. An article of manufacture adapted for wrapping purposes comprising a transparent base film or sheet formed of a non-fibrous cellulosic material coated with a moisture-resisting composition in which the film-forming constituents consist essentially of a mixture of a wax and a gum, the ratio of wax to gum being between about 1:2 and 2:2.

35. An article of manufacture adapted for wrapping purposes comprising a transparent base film or sheet formed of a non-fibrous cellulosic material coated with a moisture-resisting composition in which the film-forming constituents consist essentially of a mixture of a wax and a gum, the quantity of gum being at least equal to the quantity of wax.

36. An article of manufacture adapted for wrapping purposes comprising a transparent base film or sheet formed of a non-fibrous cellulosic material coated with a moisture-resisting composition in which the film-forming constituents consist essentially of approximately 50% by weight of a wax and about 50% by weight of a gum.

37. An article of manufacture adapted for wrapping purposes comprising a transparent base film or sheet of regenerated cellulose coated with a moisture-resisting composition in which the film-forming constituents consist essentially of a mixture of a wax and a gum, the ratio of wax to gum being between about 1:2 and 2:2.

38. An article of manufacture adapted for wrapping purposes comprising a transparent base film or sheet of regenerated cellulose coated with a moisture-resisting composition in which the film-forming constituents consist essentially of a mixture of a wax and a gum, the quantity of gum being at least equal to the quantity of wax.

39. An article of manufacture adapted for wrapping purposes comprising a transparent base film or sheet of regenerated cellulose coated with a moisture-resisting composition in which the film-forming constituents consist essentially of approximately 50% by weight of a wax and about 50% by weight of a gum.

40. An article of manufacture comprising a transparent base film or sheet formed of a non-fibrous cellulosic material coated with a moisture-proofing composition in which the film-forming constituents consist essentially of a wax and ester gum, the ingredients constituting the coating being present in proportions producing a moistureproof, flexible and transparent product.

41. An article of manufacture comprising a transparent base film or sheet of regenerated cellulose coated with a moistureproofing composition in which the film-forming constituents consist essentially of a wax and ester gum, the ingredients constituting the coating being present in proportions producing a moistureproof, flexible and transparent product.

42. An article of manufacture comprising a transparent base sheet or film formed of a non-fibrous cellulose material coated with a moisture-proofing composition in which the constituents consist essentially of a wax, ester gum and a plasticizer, the ingredients constituting the coating being present in proportions producing a moistureproof, flexible and transparent product.

43. An article of manufacture comprising a transparent base film or sheet of regenerated cellulose coated with a moistureproofing composition in which the ingredients constituting the coating consist essentially of a wax, ester gum and a plasticizer, the ingredients constituting the coating being present in proportions producing a moistureproof, flexible and transparent product.

44. In combination, a base having a surface and a coating formed on a surface of the base consisting essentially of wax, ester gum and a plasticizer.

45. An article of manufacture comprising a thin, flexible, transparent, non-fibrous cellulosic sheet coated with a film of a moistureproofing composition, the film-forming constituents of which consist essentially of a mixture of a wax and ester gum.

46. An article of manufacture comprising a thin, flexible, transparent, regenerated cellulose sheet coated with a film of a moistureproofing composition, the film-forming constituents of which consist essentially of a mixture of a wax and ester gum.

47. An article of manufacture comprising a base sheet coated with a moistureproofing composition, the film-forming constituents of which consist essentially of a mixture of a wax and a gum.

48. An article of manufacture comprising a non-fibrous base sheet or film coated with a moistureproofing composition, the film-forming constituents of which consist essentially of a mixture of a wax and a gum.

49. An article of manufacture comprising a transparent, non-fibrous, cellulosic base sheet or film coated with a moistureproofing composition, the film-forming constituents of which consist essentially of a mixture of a wax and a gum.

50. An article of manufacture comprising a flexible, transparent, regenerated cellulosic base sheet or film coated with a moistureproofing composition, the film-forming constituents of which consist essentially of a mixture of a wax and a gum.

51. A moistureproofing composition in which the film-forming constituents consist essentially of a wax and a gum.

52. A moistureproofing composition in which the film-forming constituents consist essentially of a wax and a gum, the ratio of wax to gum being between about 1:2 and 2:2.

53. A moistureproofing composition in which the film-forming constituents consist essentially of a wax and ester gum.

54. A moistureproofing composition in which the film-forming constituents consist essentially of a wax and ester gum, the ratio of wax to ester gum being between about 1:2 and 2:2.

55. An article of manufacture comprising a base sheet coated with a moistureproofing composition, the film-forming constituents of which consist essentially of a mixture of a wax and a synthetic resin.

56. A moistureproofing composition in which the film-forming constituents consist essentially of a wax and a synthetic resin.

WILLIAM HALE CHARCH.